US012589946B2

(12) United States Patent
Rakshit et al.

(10) Patent No.: US 12,589,946 B2
(45) Date of Patent: Mar. 31, 2026

(54) ADJUSTABLE SCREW CONVEYOR FOR MATERIAL PROCESSING

(71) Applicant: INTERNATIONAL BUSINESS MACHINES CORPORATION, Armonk, NY (US)

(72) Inventors: Sarbajit K. Rakshit, Kolkata (IN); Binoy Thomas, Kozhikode (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 18/603,506

(22) Filed: Mar. 13, 2024

(65) Prior Publication Data

US 2025/0289669 A1     Sep. 18, 2025

(51) Int. Cl.
*B65G 33/14*          (2006.01)
*B65G 33/26*          (2006.01)

(52) U.S. Cl.
CPC ........... *B65G 33/265* (2013.01); *B65G 33/14* (2013.01); *B65G 2207/08* (2013.01)

(58) Field of Classification Search
CPC ... B65G 33/14; B65G 33/265; B65G 2207/08
USPC ............................ 198/550.1, 550.6; 222/412
See application file for complete search history.

(56) References Cited

U.S. PATENT DOCUMENTS 3,280,963 A * 10/1966 Kirker, Jr. ............. B29C 48/507
                                                                  198/677
4,386,695 A * 6/1983 Olson ................... B65G 33/265
                                                                  414/307

5,333,762 A * 8/1994 Andrews ................ B65G 65/46
                                                                  222/413
6,000,995 A * 12/1999 Ruholl .................. B24C 7/0061
                                                                  451/100
6,220,486 B1 * 4/2001 Teramachi .............. B05B 7/144
                                                                  222/240
8,691,050 B2   4/2014 Christensen
8,739,963 B2   6/2014 Nickerson
                    (Continued)

FOREIGN PATENT DOCUMENTS

CN        201923610 U      8/2011
CN        113911655 A      1/2022
                    (Continued)

OTHER PUBLICATIONS

Andritz, "Andritz Adjustable Plug Screw Feeder," https://www. andritz.com/resource/blob/499050/ 422b1e779ac85fada8aeafb7a42f6151/adjustable-psf-data.pdf, Accessed: Jan. 9, 2024, 5 pages.

(Continued)

*Primary Examiner* — Douglas A Hess
(74) *Attorney, Agent, or Firm* — Tihon Poltavets

(57) ABSTRACT

An adjustable screw conveyor includes a plurality of adjustable helical blades disposed in an enclosure having an inlet at a first end of the enclosure and an outlet at a second end of the enclosure, where the plurality of adjustable helical blades includes a first blade and a second blade. The adjustable screw conveyor further includes the plurality of adjustable helical blades being coupled to a first shaft via a plurality of pitch adjustment modules, where a pitch between the first blade and the second blade of the plurality of adjustable helical blades is adjustable.

20 Claims, 5 Drawing Sheets

(56) References Cited

U.S. PATENT DOCUMENTS 9,851,156 B2    12/2017  Whitney
11,608,236 B2 *   3/2023  Olson  .................. B65G 65/463

FOREIGN PATENT DOCUMENTS

CN          219481623  U      8/2023
WO      WO-2024228653  A1 *  11/2024  .............. D21C 1/00

OTHER PUBLICATIONS

Chakarborthy et al., "Product Design of Semi Flexible Screw Conveyor," IOSR Journal of Mechanical and Civil Engineering (IOSR-JMCE), vol. 11, Issue 5 Ver. IV (Sep.-Oct. 2014), https://www.researchgate.net/publication/280859682_Product_Design_of_Semi_Flexible_Screw_Conveyor, 14 pages.
China, "Five machine learning types to know," IBM, Dec. 20, 2023, https://www.ibm.com/blog/, 11 pages.
IBM, "Mobile EAM with IBM Maximo Application Suite," https://www.ibm.com/products/maximo/mobile-eam, Accessed: Jan. 9, 2024, 9 pages.
KWS, "Dimensional Layout of a Screw Conveyor," https://www.kwsmfg.com/engineering-guides/screw-conveyor/dimensional-layout-of-conveyor/, Accessed: Jan. 9, 2024, 3 pages.
KWS, "Types of Screw Conveyors," https://www.kwsmfg.com/engineering-guides/screw-conveyor/types-of-screw-conveyors/, Accessed Jan. 9, 2024, 9 pages.
Mistry, "Construction and Working of Screw Conveyor," Solution Parmacy, May 10, 2021, https://solutionpharmacy.in/screw-conveyor/, 7 pages.

* cited by examiner

100

ADJUSTABLE SCREW CONVEYOR FOR MATERIAL PROCESSING

BACKGROUND

This disclosure relates generally to screw conveyors, and in particular to an adjustable screw conveyor for material processing.

A screw conveyor is a mechanism that can move material through a tube structure, where a helical screw within the tube structure moves the material as the helical screw rotates. Screw conveyors are utilized in various industrial and agricultural applications for moving material between two locations. A general structure of the screw conveyor includes the helical screw positioned within the tube structure, where a motor provides a rotational torque to rotate the helical screw to move the material disposed in the tube structure at an inlet via the helical surface (i.e., helicoid) of the helical screw towards an outlet. The screw conveyor includes adjustments for material processing, such as, an amount of material entering the inlet of the tube structure (i.e., feed rate) and a rotational speed of the motor.

SUMMARY

A first aspect of an embodiment of the present invention discloses an apparatus for a cutting tool with an adjustable screw conveyor, the apparatus comprising a plurality of adjustable helical blades disposed in an enclosure having an inlet at a first end of the enclosure and an outlet at a second end of the enclosure, wherein the plurality of adjustable helical blades includes a first blade and a second blade. The apparatus further comprising the plurality of adjustable helical blades are coupled to a first shaft via a plurality of pitch adjustment modules, wherein a pitch between the first blade and the second blade of the plurality of adjustable helical blades is adjustable.

A second aspect of an embodiment of the present invention discloses a method for configuring an adjustable screw conveyor, the method comprising determining material specification and a plurality of material processing properties. The method further comprising determining a configuration for the adjustable screw conveyor based on the material specification and the plurality of material processing properties. The method further comprising deactivating a shaft coupling mechanism for the adjustable screw conveyor. The method further comprising activating a plurality of pitch adjustment modules for the adjustable screw conveyor. The method further comprising activating a motor mechanism for the adjustable screw conveyor.

DETAILED DESCRIPTION

Figure 1:
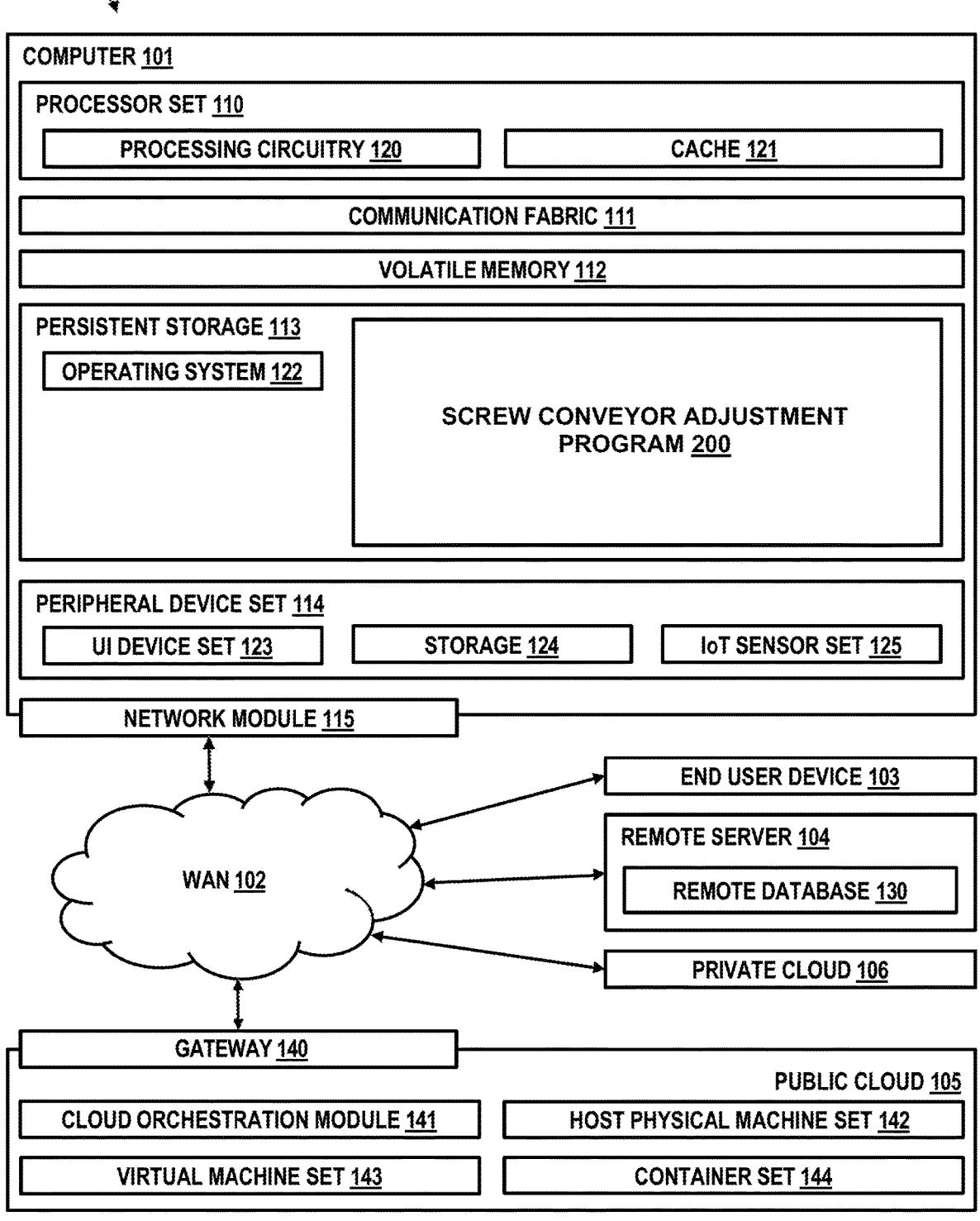
FIG. 1 is a functional block diagram illustrating a computing environment, in accordance with an embodiment of the present invention.

Embodiments of the present invention address the material handling complexities in screw conveyors by controlling the pitch of the blade based on material specifications, flow rate control, and processing needs. A hydraulic system can adjust the pitch, with pitch control adjustable modules along a length of a screw conveyor. The pitch adjustment influences material flow rate and processing of the material that enters through an input portion of the screw conveyor and exits through an outlet portion of the screw conveyor. Additionally, a heating coil on the helical blade surface provides heat for material processing if required based on the processing needs. To enhance material processing further, studs on the shaft can be raised and the pitch adjusted. This combination enables efficient and adaptable material movement, processing, and control in the screw conveyor system. Overall, the system offers a controllable and efficient approach to handling various materials, managing flow rates, and performing processing tasks within the screw conveyors.

Embodiments of the present invention provide an adjustable screw conveyor, where a pitch of a helical screw is adjustable based on material specification and material processing parameters. Embodiments of the present invention can utilize historical learning for controlling the pitch of the helical blade in the screw conveyor, so that purpose of material movement is achieved. The pitch of the helical blade of the screw conveyor can be adjusted with a hydraulic system on the shaft of the screw conveyor and the pitch of the helical blade can be increased or decreased. Each touch point of the helical blade on the shaft of the screw conveyor can include a programable controlled pitch adjustable module, where the pitch adjustable module can adjust the pitch such that there is a varied pitch along the length of the screw conveyor. Based on the need of adjusting the pitch of the helical blade on the screw conveyor, embodiments of the present invention can control the material flow rate on the inlet, evaluate the presence on the material on the screw conveyor, and the pitch adjustable module can adjust the pitch.

The helical blade surface of the screw conveyor, can include a heating coil, based on material processing requirements. Embodiments of the present invention can enable the heating coil on the surface of the blade in a selective manner to generate the required heat while the material is moving through the screw convey and the material can be further processed with the generated heat. Based on the material processing requirements (i.e., parameters) on the screw conveyor, such as, crushing and mixing multiple types of materials on the screw conveyor, embodiments of the present invention can control the raising of studs on the shaft of the screw conveyor along with adjusting the pitch of the screw conveyor. The structure includes a helical spring like collapsible helical blade with the screw conveyor that involves creating a mechanism that utilizes the flexibility of the helical blade to adjust the pitch within predefined limits. The material for the helical blade is such that it can withstand the material being transported and an operational environment for the adjustable spring conveyor. During selection of the helical blade material, embodiments of the present invention select a material having the required spring constant, hardness, and/or ductility. Embodiments of the present invention can utilize a database on material properties and during the design determine an expected payload of material and an allowed hardness level of the material.

Embodiments of the present invention include one or more pitch adjustment modules. The shaft of the adjustable screw conveyor can include the pitch adjustment modules to adjust the pitch by compressing or expanding the helical spring. The pitch adjustment modules can be hydraulic or pneumatic, where the helical blade is coupled to the pitch adjustment modules on the shaft and can slide to connect with the touch points on the helical blade.

Embodiments of the present invention can include a controlled hydraulic system to adjust the pitch. The hydraulic controlled mechanism can adjust the compression or expansion of the helical blade based on the processing requirements and material specification. The helical blade can include a sensor coupled to a surface of the helical blade to detect the stress on the surface due to the material being process and to detect a pitch value for the helical blade on the screw conveyor. The individual hydraulic controlled pitch adjustable module can change the pitch in a selective manner.

Embodiments of the present invention can define a range for the blade movement. The pitch adjustable module can define a range utilizing a mechanism that prevents the helical blade from being compressed or elongated beyond a specified range. Limit switches and/or physical stops can ensure that the pitch of the helical blade remains within the specified range.

Embodiments of the present invention can include a shape of the screw conveyor that provides linear guides. For example, the shaft of the screw conveyor can act as a linear guide or track that defines the movement of the helical blade, where the linear guides ensure that the helical blade moves uniformly and accurately.

Embodiments of the present invention can include a control system which can identify the required pitch of the helical blade. Embodiments of the present invention can analyze the material movement, specification, historical learning, and the predefined configuration. Based on the analyzing, embodiments of the present invention can control and manage the adjustment process. Embodiments of the present invention can gather the purpose of material handling and processing requirements of the screw conveyor and identify the required pitch for the helical blade.

Embodiments of the present invention can provide durability and material selection and can choose appropriate materials for the helical blade that are durable and resistant to wear and corrosion. The helical blade material can be selected based on what can handle the repeated adjustments and the stress of material transported through the screw conveyor.

An inner surface of the helical blade can include a heating coil, where in a selective manner the heating coil can be enabled, and heat can be generated at different points along the screw conveyor for processing the material. The shaft of the screw conveyor can have deployable studs, where the studs can be elevated such that the stubs apply a crushing force on the material when the helical blade is rotated An array of studs can be positioned on the shaft of the helical blade of the screw conveyor, where the studs be raised and retracted on the shaft based on the material processing requirements.

While the screw conveyor is operating, embodiments of the present invention can identify appropriate pitch of the helical blade in the screw conveyor to ensure efficient material transport, to prevent clogging, and to achieve the desired material handling performance. Embodiments of the present invention can consider material characteristics by analyzing the properties of the material to be transported, including but not limited to particle size, density, flowability, moisture content, and abrasiveness. Embodiments of the present invention can further analyze the physical properties of the material, such as, cohesive, fine, and irregularly shaped materials that might require different pitch considerations compared to granular or free-flowing materials. Based on the material flow purpose, embodiments of the present invention can utilize historical data and/or manual configuration to determine a required material flow rate. Embodiments of the present invention can calculate the required material flow rate in terms of volume per unit of time (e.g., cubic feet per minute, cubic meters per hour) and the flow rate influences the pitch selection to ensure the screw conveyor can handle the specified amount of material. Embodiments of the present invention can consider the conveyor inclination angle and whether it can be altered. If the screw conveyor is inclined, then embodiments of the present invention factor in the angle of inclination of the screw conveyor. Inclined screw conveyors can require adjustments to the pitch to ensure material doesn't backflow.

Based on the required material flow rate, embodiments of the present invention can calculate a required pitch. Embodiments of the present invention can utilize the formula: Pitch=(Material Flow Rate)/(Helical Blade Speed)/(Number of Flights). Embodiments of the present invention can consider the helical blade rotational speed based on the desired throughput and helical blade diameter. Embodiments of the present invention can consider the number of flights (i.e., blades) based on the helical blade diameter and the desired balance between material handling capacity and available space. Embodiments of the present invention can also consider the material characteristics to determine if the material is prone to clogging or bridging. For cohesive materials, a larger pitch of the helical blade can help prevent material buildup in the screw conveyor.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as, screw conveyor adjustment program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
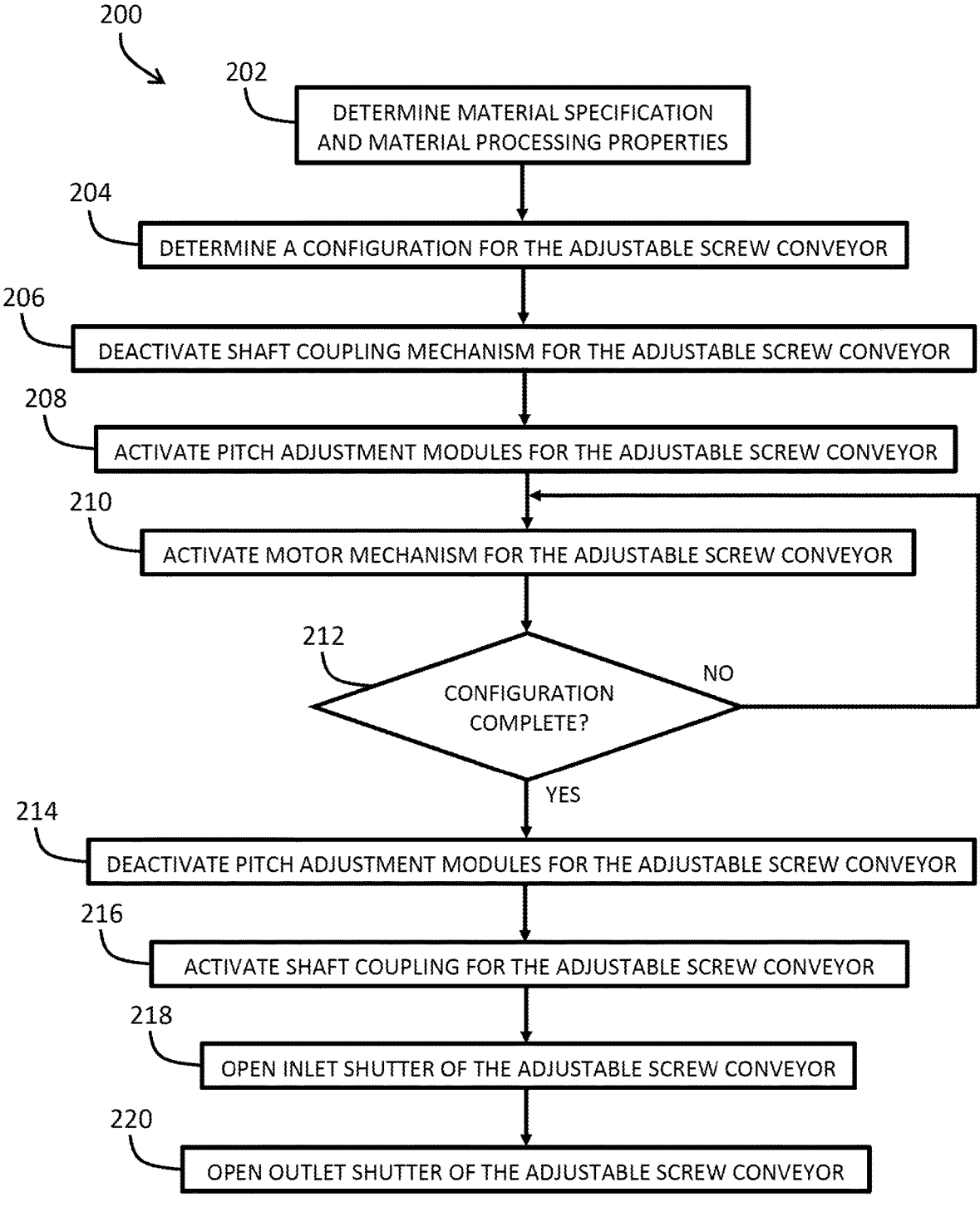
FIG. 2 depicts a flowchart of a screw conveyor adjustment program for configuring a helical screw within an adjustable screw conveyor based on material specification and material processing parameters, in accordance with an embodiment of the present invention.

FIG. 2 depicts a flowchart of a screw conveyor adjustment program for configuring a helical screw within an adjustable screw conveyor based on material specification and processing parameters, in accordance with an embodiment of the present invention.

Screw conveyor adjustment program 200 determines material specification and material processing properties (202). Prior to processing material through the adjustable screw conveyor, screw conveyor adjustment program 200 determines the material specification and the material processing properties for the materials passing through the adjustable screw conveyor. Material specification can include but is not limited to particle size, density, flowability, moisture content, and abrasiveness. Material processing properties can include but is not limited to processing flow rates and processing thermal requirements. Screw conveyor adjustment program 200 determines a configuration for the adjustable screw conveyor (204) based on the determined material specification and the determined material processing properties. The configuration can include pitch values for the adjustable screw conveyor, a rotational speed for a motor mechanism of the adjustable screw conveyor, a shaft coupling mechanism setting for the adjustable screw conveyor, heat settings for the adjustable screw conveyor, and deployable stud settings for the adjustable screw conveyor.

Screw conveyor adjustment program 200 deactivates a shaft coupling mechanism for the adjustable screw conveyor (206). To adjust the pitch for the adjustable screw conveyor, screw conveyor adjustment program 200 deactivates the shaft coupling mechanism to allow for an inner shaft coupled to a motor mechanism to rotate independently from an outer shaft with the multiple helical blades. Screw conveyor adjustment program 200 activates pitch adjustment modules for the adjustable screw conveyor (208). In this embodiment, multiple pitch adjustment modules are positioned between each blade of the multiple helical blades on an inner surface of the outer shaft and are hydraulically operated by screw conveyor adjustment program 200. By activating the pitch adjustment modules for the adjustable screw conveyor, a guide block is hydraulically deployed out of each of the multiple pitch adjustment modules and engages with a track positioned on an exterior surface of the inner shaft.

Screw conveyor adjustment program 200 activates a motor mechanism for the adjustment screw conveyor (210). By activating the motor mechanism, the inner shaft rotates independently from the outer shaft and each of the guide blocks of the multiple pitch adjustment modules move along the track positioned on the exterior surface of the inner shaft. Depending on a rotational direction (i.e., clockwise or counterclockwise), the pitch of the adjustable screw conveyor increases or decreases as the guide blocks of the multiple pitch adjustment modules move up or down along the track positioned on the exterior surface of the inner shaft. It is to be noted, if the shaft coupling mechanism was activated, the inner shaft would rotate with the outer shaft and the pitch would remain constant for the adjustable screw conveyor.

Screw conveyor adjustment program 200 determines whether a configuration is complete (decision 212). In the event screw conveyor adjustment program 200 determines the configuration is complete ("yes" branch, decision 212), screw conveyor adjustment program 200 deactivates the pitch adjustment module for the adjustment screw conveyor (214). In the event screw conveyor adjustment program 200 determines the configuration is not complete ("no" branch, decision 212), screw conveyor adjustment program 200 reverts to keeping the motor mechanism active for the adjustment screw conveyor.

Screw conveyor adjustment program 200 deactivates the pitch adjustment modules for the adjustment screw conveyor (214). By deactivating the pitch adjustment modules for the adjustment screw conveyor, the blocks for each of the pitch adjustment modules are retracted and the blocks are no longer engaged with the track positioned on the exterior surface of the inner shaft. Deactivating the pitch adjustment modules ensures that any vibrations during an operational state of the adjustment screw conveyor does not result in damage to the pitch adjustment modules since the blocks are clear of the tracks positioned on the exterior surface of the inner shaft.

Screw conveyor adjustment program 200 activates the shaft coupling for the adjustment screw conveyor (216). By activating the shaft coupling, the inner shaft rotates with the outer shaft with the multiple helical blades to move any material along the adjustable screw conveyor. Screw conveyor adjustment program 200 opens an inlet shutter of the adjustable screw conveyor (218) and opens an outlet shutter of the adjustable screw conveyor (220). By opening the inlet shutter, material can enter the adjustable screw conveyor at a first end of the enclosure of the adjustable screw conveyor where the inlet shutter is located. The material moves through the enclosure of the adjustable screw conveyor via the multiple helical blades that are rotating towards a second end of the shift where the outlet shutter is located.

Figure 3:
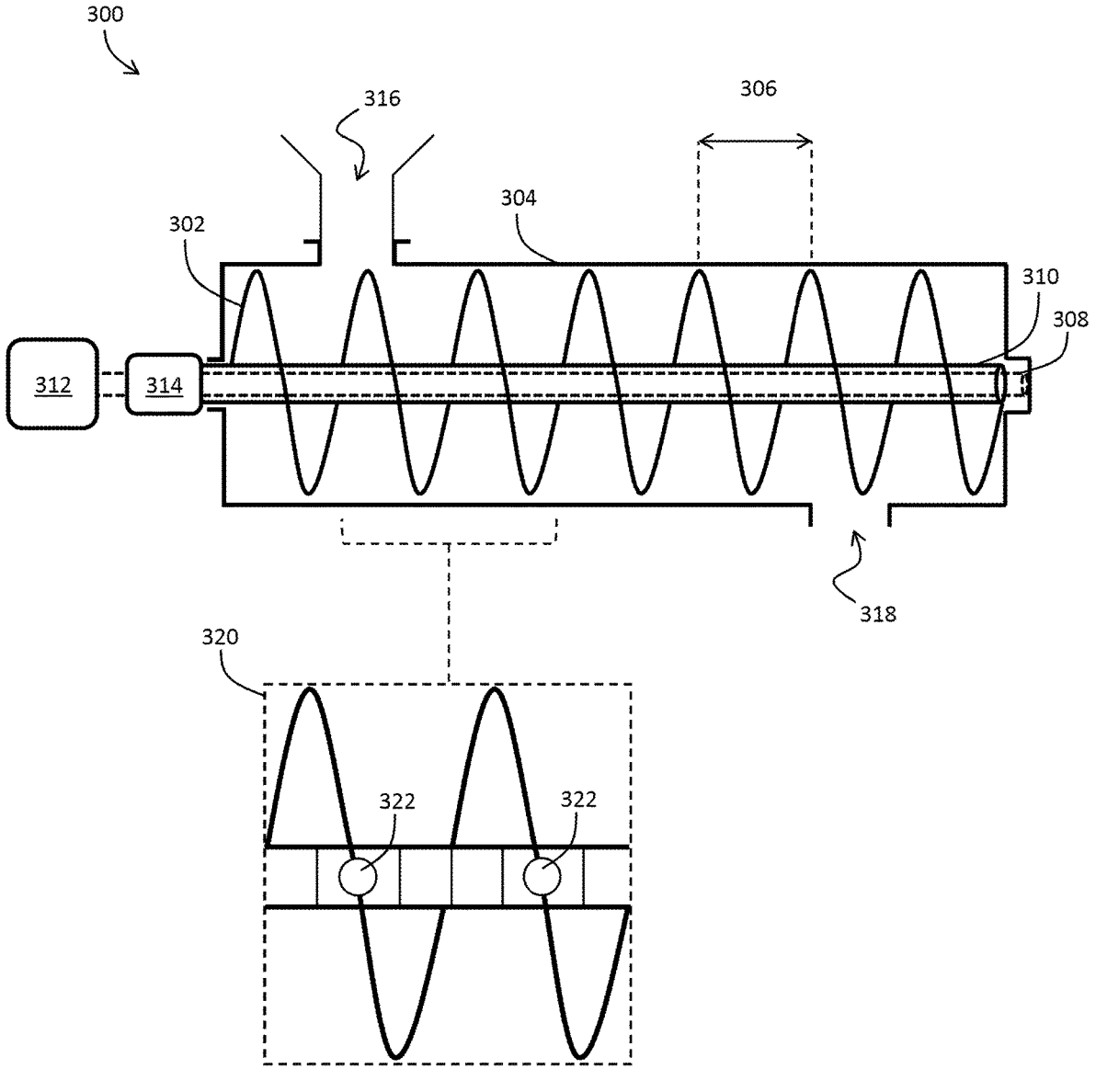
FIG. 3 depicts a sideview of an adjustable screw conveyor in a first configuration for material processing, in accordance with an embodiment of the present invention.

FIG. 3 depicts a sideview of an adjustable screw conveyor in a first configuration for material processing, in accordance with an embodiment of the present invention. In this embodiment, adjustable screw conveyor 300 includes adjustable helical blades 302 disposed in enclosure 304, where enclosure 304 is cylindrical in shape. In this first configuration, adjustable screw conveyor 300 includes adjustable helical blades 302 set at first pitch distance 306 between each helical portion of adjustable helical blades 302. Adjustable helical blades 302 have spring type characteristics, where different portions of adjustable helical blades 302 can compress or extend creating different pitch values for the blades along the different portions of adjustable helical blades 302. Inner shaft 308 is disposed within outer shaft 310, where inner shaft 308 can rotate dependently or independently of outer shaft 310. For discussion purposes, each helical portion of adjustable helical blades 302 represents a single helical blade rotated 360 degrees around outer shaft 310, where in this embodiment adjustable helical blades 302 includes seven blades. Inner shaft 308 is disposed through a central axis of outer shaft 310 and outer shaft 310 is disposed through a central axis of adjustable helical blades 302.

Motor mechanism 312 is mechanically coupled to inner shaft 308 and provides a rotational torque to inner shaft 308. Motor mechanism 312 is bidirectional can rotate in a clockwise or counterclockwise direction. Shaft coupling mechanism 314 mechanically couples and decouple outer shaft 310 from inner shaft 308. In a decoupled state (i.e., deactivated), outer shaft 310 does not rotate when a torque is applied to inner shaft 308 by motor mechanism 312. Therefore, in the decoupled state inner shaft 308 rotates independently from outer shaft 310. In a coupled state (i.e., activated), outer shaft 310 rotates when a torque is applied to inner shaft 308 by motor mechanism. Therefore, in the coupled state outer shaft 310 rotates with inner shaft 308. Enclosure 304 includes inlet 316 at a first end of adjustable screw conveyor 300 and outlet 318 at a second end of adjustable screw conveyor 300. When adjustable screw conveyor 300 is actively processing material, the material enters adjustable screw conveyor 300 via inlet 316, motor mechanism 312 spins inner shaft 308 coupled to outer shaft 310 with adjustable helical blades 302, and the rotational movement of adjustable helical blades 302 moves the material towards outlet 318. Enhanced view 320 illustrates two helical blades of adjustable helical blades 302, where each helical blade of adjustable helical blade 302 is coupled to outer shaft 310 via pitch adjustment module 322. The operations of each pitch adjustment module 322 is discussed in further detail with regards to FIGS. 5 and 6.

Figure 4:
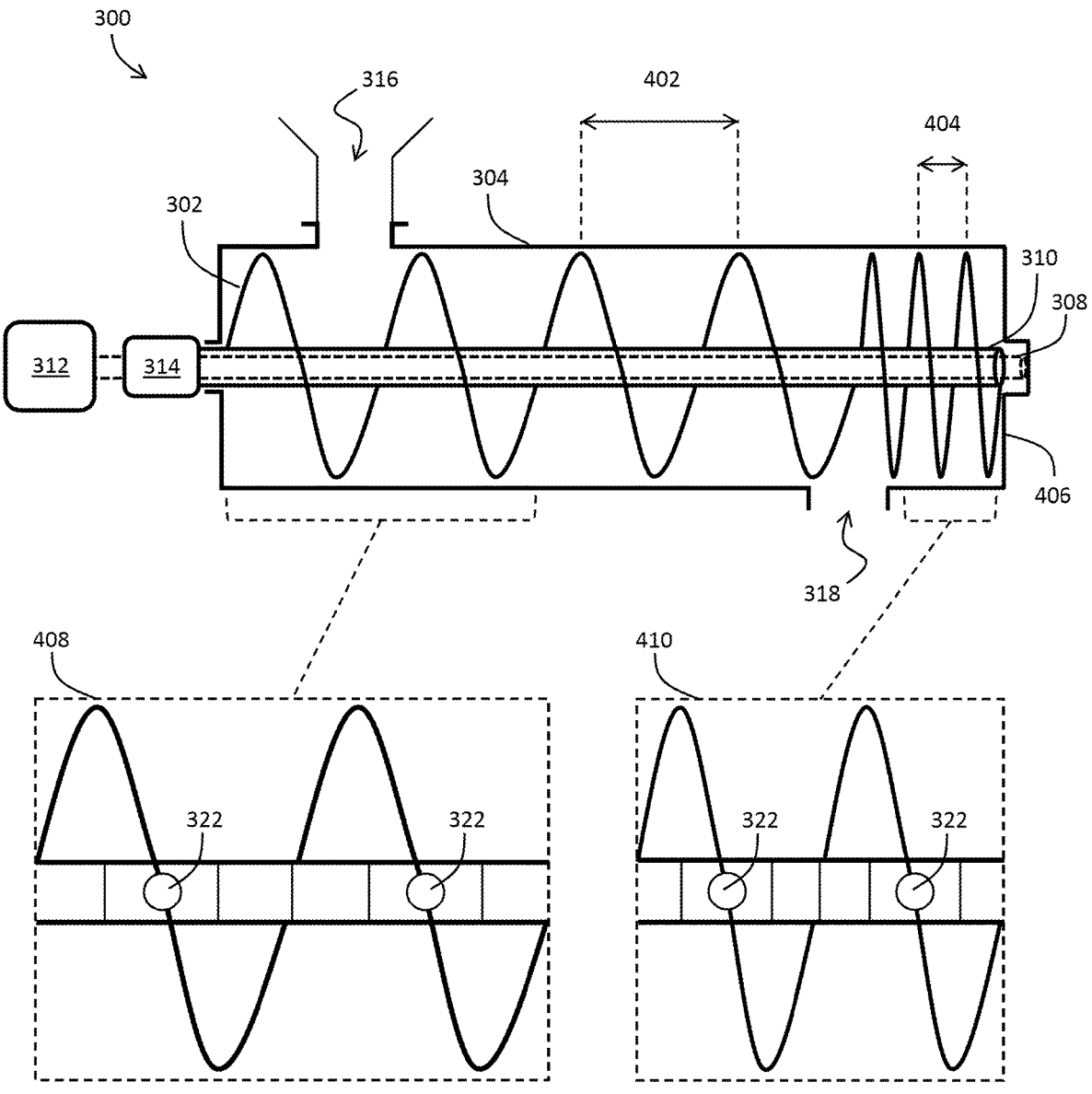
FIG. 4 depicts a sideview of an adjustable screw conveyor in a second configuration for material processing, in accordance with an embodiment of the present invention.

FIG. 4 depicts a sideview of an adjustable screw conveyor in a second configuration for material processing, in accordance with an embodiment of the present invention. In the second configuration, adjustable screw conveyor 300 includes a first portion of adjustable helical blades 302 set at second pitch distance 402 between each helical blade and a second portion of adjustable helical blades 302 set at third pitch distance 404 between each helical blade. The first portion of adjustable helical blades 302 with second pitch distance 402 is elongated when compared to first pitch distance 306 from the first configuration in FIG. 3. The second portion of adjustable helical blade 302 with third pitch distance 404 is compressed when compared to first pitch distance 306 from the first configuration in FIG. 3. In this embodiment, adjustable screw conveyor 300 increased a pitch from first pitch distance 306 from the first configuration in FIG. 3 to second pitch distance 402 between inlet 316 and outlet 318. In order to obtain the increased pitch (i.e., second pitch distance 402) between inlet 316 and outlet

318, adjustable screw conveyor 300 compresses the second portion of adjustable helical blades 302 and decreases the pitch (i.e., third pitch distance 404). The second portion of adjustable helical blades 302 is located in an area between outlet 318 located and end cap 406 of enclosure 304, where the second portion of adjustable helical blades 302 does not process any material as it travels between inlet 316 and outlet 318.

In order to configure adjustable screw conveyor 300 from first distance 306 from the first configuration in FIG. 3 to second pitch distance 402 in the second configuration, screw conveyor adjustment program 200 deactivates shaft coupling mechanism 314 for adjustable screw conveyor 300, activates each pitch adjustment module 322, and activates motor mechanism 312 for adjustment screw conveyor 300. The activated motor mechanism 312 combined with the deactivated shaft coupling mechanism 314 results in outer shaft 310 remaining fixed as motor mechanism 312 applies a rotational torque to inner shaft 308. With the activated pitch adjustment modules 322, the rotational torque to inner shaft 308 adjusts the pitch of adjustable helical blades 302 of adjustable screw conveyor 300 positioned between inlet 316 and outlet 318. As previously mentioned, the first portion of adjustable helical blades 302 with second pitch distance 402 is positioned to include a first length between inlet 316 and outlet 318 of enclosure 304. The second portion of adjustable helical blades 302 with third pitch distance 404 is positioned to include a second length between outlet 318 and end cap 406 of enclosure 304. Enhanced view 408 illustrates two helical blades of adjustable helical blades 302 with pitch adjustment modules 322 in the first portion and enhanced view 410 illustrates two helical blades of adjustable helical blades 302 with pitch adjustment modules 322 located in the second portion.

Figures 5, 6:
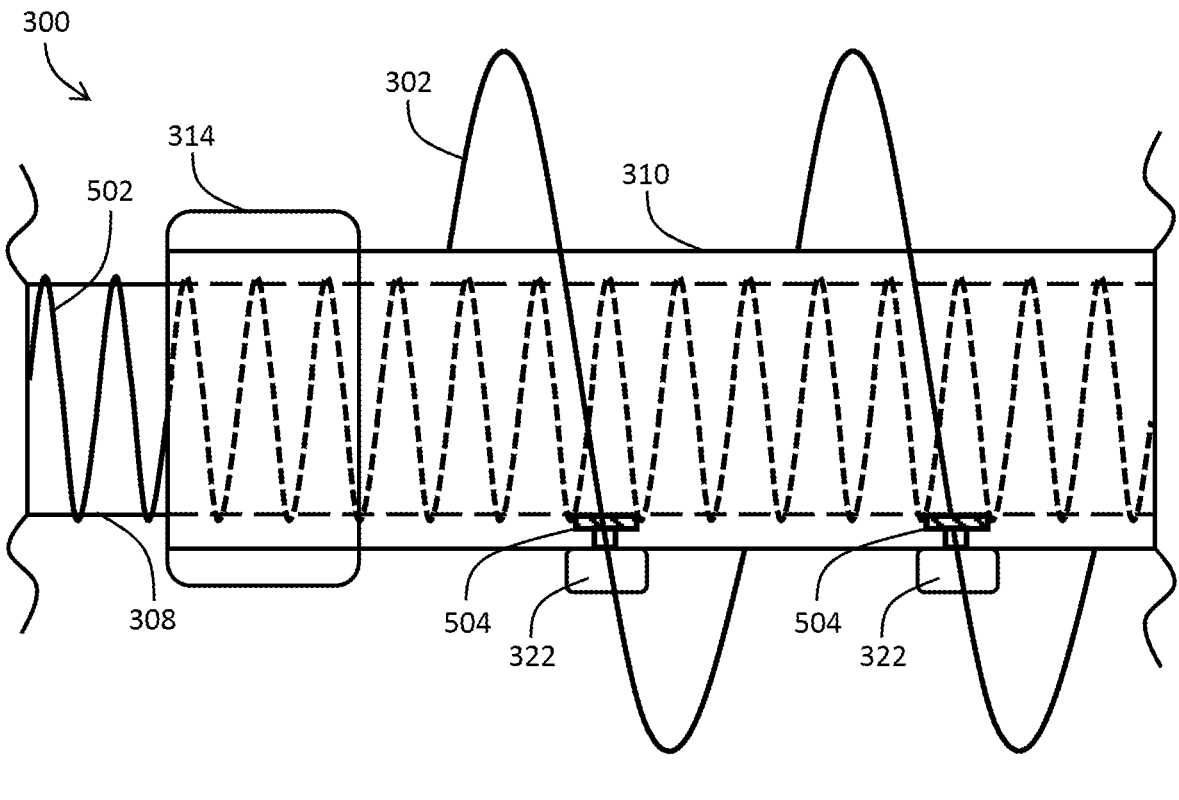
FIG. 5 depicts an enhanced sideview of an adjustable screw conveyor with a pitch adjustment module in an engaged position, in accordance with an embodiment of the present invention.
FIG. 6 depicts an enhanced sideview of an adjustable screw conveyor with a pitch adjustment module in a disengaged position, in accordance with an embodiment of the present invention.

FIG. 5 depicts an enhanced sideview of an adjustable screw conveyor with a pitch adjustment module in an engaged position, in accordance with an embodiment of the present invention. It is to be noted, that enclosure 304 is not illustrated for simplification in the enhanced sideview of a portion of adjustable screw conveyor 300. As previously discussed, inner shaft 308 is disposed through a central axis of outer shaft 310 and shaft coupling mechanism 314 can couple and decouple outer shaft 310 from inner shaft 308. Track 502 is positioned on an exterior surface of inner shaft 308, where block 504 of pitch adjustment module pitch in an activated position is disposed on and engages with track 502. In this embodiment, track 502 is positioned along an entire length of an exterior surface of inner shaft 308 in a helical configuration. In another embodiment, track 502 is positioned along a portion of a length of exterior surface of inner shaft 308, where the portion of the length is located between shaft coupling mechanism 314 and end cap 406 of adjustable screw conveyor 300 from FIG. 4. To configure a pitch of adjustable screw conveyor 300, screw conveyor adjustment program 200 deactivates shaft coupling mechanism 314 to allow inner shaft 308 to rotate independently from outer shaft 310. Screw conveyor adjustment program 200 further activates pitch adjustment modules 322 and deploys block 504 to engage with track 502 and activates motor mechanism 312 from FIG. 4 to rotate inner shaft 308. Since shaft coupling mechanism 314 is deactivates, inner shaft 308 rotates while outer shaft 310 remains stationary. With the deployed blocks 504 of pitch adjustment modules 322 engaged on track 503 of inner shaft 308, the pitch of adjustable helical blades 302 is altered. Each pitch adjustment module 322 can activate and deactivate independently from one another, resulting in varying pitch values along different portions of adjustable helical blades 302.

FIG. 6 depicts an enhanced sideview of an adjustable screw conveyor with a pitch adjustment module in a disengaged position, in accordance with an embodiment of the present invention. In this embodiment, pitch adjustment module 322 is deactivated and block 504 is retracted, where block 504 is no longer disposed on and disengaged from track 502 of inner shaft 308. When compared to the pitch of adjustable helical blades 302 in FIG. 5, the pitch of adjustable helical blades 302 has increased. To complete a configuration of pitch for adjustable screw conveyor 300, screw conveyor adjustment program 200 activates shaft coupling mechanism 314 to allow inner shaft 308 to rotate with outer shaft 310. Screw conveyor adjustment program 200 further deactivates pitch adjustment modules 322 and retracts block 504 to disengage with track 502 and activates motor mechanism 312 from FIG. 4 to rotate inner shaft 308 with outer shaft 310.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An adjustable screw conveyor comprising:

a plurality of adjustable helical blades disposed in an enclosure having an inlet at a first end of the enclosure and an outlet at a second end of the enclosure, wherein the plurality of adjustable helical blades includes a first blade and a second blade; and the plurality of adjustable helical blades are coupled to a first shaft via a plurality of pitch adjustment modules located along a length of the first shaft, wherein a pitch between the first blade and the second blade of the plurality of adjustable helical blades is adjustable.

2. The adjustable screw conveyor of claim 1, further comprising:

a second shaft disposed within the first shaft, wherein the first shaft is an outer shaft and the second shaft is an inner shaft; and the second shaft coupled to a motor mechanism.

3. The adjustable screw conveyor of claim 2, wherein the first shaft is coupled to a shaft coupling mechanism.

4. The adjustable screw conveyor of claim 3, wherein the shaft coupling mechanism in an engaged position mechanically couples the first shaft to the second shaft and a rotational torque applied by the motor mechanism to the second shaft is transferred to the first shaft.

5. The adjustable screw conveyor of claim 3, wherein the shaft coupling mechanism in a disengaged position mechanically decouples the first shaft to the second shaft and a rotational torque applied by the motor mechanism to the second shaft is not transferred to the first shaft.

6. The adjustable screw conveyor of claim 3, further comprising:

a track positioned on an exterior surface of the second shaft.

7. The adjustable screw conveyor of claim 6, further comprising:

a first pitch adjustment module coupled to the first blade, wherein a first block of the first pitch adjustment module is configured to engage with the track on the exterior surface of the second shaft when activated; and a second pitch adjustment module coupled to the second blade, wherein a second block of the second pitch adjustment module is configured to engage with the track on the exterior surface of the second shaft when activated.

8. The adjustable screw conveyor of claim 7, wherein a first portion of the plurality of adjustable helical blades coupled to the first shaft are at a first pitch and a second portion of the plurality of adjustable helical blades coupled to the first shaft are at a second pitch.

9. The adjustable screw conveyor of claim 8, wherein the first portion of the plurality of adjustable helical blades coupled to the first shaft are positioned between the inlet at the first end of the enclosure and the outlet at the second end of the enclosure.

10. The adjustable screw conveyor of claim 9, wherein the second portion of the plurality of adjustable helical blades coupled to the first shaft are positioned between the outlet at the second end of the enclosure and an end cap of the enclosure.

11. The adjustable screw conveyor of claim 10, wherein the first portion of the plurality of adjustable helical blades coupled to the first shaft includes the first blade and the second blade.

12. The adjustable screw conveyor of claim 11, wherein the second portion of the plurality of adjustable helical blades coupled to the first shaft includes a third blade and a fourth blade.

13. The adjustable screw conveyor of claim 2, wherein the plurality of adjustable helical blades is a helical spring structure.

14. The adjustable screw conveyor of claim 6, further comprising:

a first pitch adjustment module coupled to the first blade, wherein a first block of the first pitch adjustment module is configured to disengage with the track on the exterior surface of the second shaft when deactivated; and a second pitch adjustment module coupled to the second blade, wherein a second block of the second pitch adjustment module is configured to disengage with the track on the exterior surface of the second shaft when deactivated.

15. The adjustable screw conveyor of claim 2, wherein the second shaft is disposed through a first central axis of the first shaft.

16. The adjustable screw conveyor of claim 12, wherein the first shaft is disposed through a second central axis of the plurality of adjustable helical blades.

17. A method for configuring an adjustable screw conveyor, the method comprising:

determining material specification and a plurality of material processing properties;

determining a configuration for the adjustable screw conveyor based on the material specification and the plurality of material processing properties;

deactivating a shaft coupling mechanism for the adjustable screw conveyor;

activating a plurality of pitch adjustment modules for the adjustable screw conveyor; and activating a motor mechanism for the adjustable screw conveyor.

18. The method of claim 17, wherein deactivating the shaft coupling mechanism decouples an outer shaft with a plurality of adjustable helical blades from an inner shaft.

19. The method of claim 18, wherein activating the plurality of pitch adjustment modules includes a plurality of blocks engaging with a track positioned on an exterior surface of the inner shaft.

20. The method of claim 19, wherein activating the motor mechanism applies a rotational torque to the inner shaft and adjusts a pitch for the plurality of adjustable helical blades on the outer shaft via the plurality of blocks engaging with the track positioned on the exterior surface of the inner shaft.

* * * * *